(12) United States Patent
Abboud et al.

(10) Patent No.: US 8,702,565 B2
(45) Date of Patent: Apr. 22, 2014

(54) ENGINE POSITION CONTROL IN AN ENGINE STOP-START POWERTRAIN

(75) Inventors: Amin Abboud, Livonia, MI (US); Ronald F. Lochocki, Jr., Ypsilanti, MI (US); Kenneth K. Lang, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 342 days.

(21) Appl. No.: 13/186,855

(22) Filed: Jul. 20, 2011

(65) Prior Publication Data
US 2013/0023381 A1 Jan. 24, 2013

(51) Int. Cl.
*B60W 10/02* (2006.01)
*B60W 10/04* (2006.01)
*B60W 30/00* (2006.01)

(52) U.S. Cl.
USPC .......................................................... 477/181

(58) Field of Classification Search
USPC .......................................................... 477/181
See application file for complete search history.

(56) References Cited

U.S. PATENT DOCUMENTS

| 7,243,633 | B2 * | 7/2007 | Berger | 123/198 F |
|---|---|---|---|---|
| 7,415,350 | B2 * | 8/2008 | Nishikiori | 701/112 |
| 7,739,018 | B2 * | 6/2010 | Adachi | 701/58 |
| 2010/0031910 | A1 * | 2/2010 | Seufert et al. | 123/179.3 |
| 2010/0228462 | A1 * | 9/2010 | Verdejo et al. | 701/102 |
| 2010/0279818 | A1 * | 11/2010 | Soliman et al. | 477/5 |

FOREIGN PATENT DOCUMENTS

| DE | 103 31 151 | * 1/2005 |
|---|---|---|
| JP | 06-312312 | * 11/1994 |

\* cited by examiner

*Primary Examiner* — Sherry Estremsky
(74) *Attorney, Agent, or Firm* — Quinn Law Group, PLLC

(57) ABSTRACT

A vehicle having engine stop-start functionality includes a transmission, engine, and controller. The transmission includes a clutch, and the engine includes a crankshaft. The controller is in communication with the engine and the transmission, and is configured for detecting a commanded shut down of the engine, and then engaging the clutch to control a rate of deceleration of the crankshaft and stop the crankshaft within a calibrated range of a target stop position at the end of engine shut down. A method for controlling engine stop position includes detecting a commanded shut down of the engine, and engaging the clutch after detecting the commanded shut down to thereby control the rate of deceleration of the crankshaft and stop the crankshaft within a calibrated range of a target stop position at the end of shut down of the engine. The transmission may be automatic or it may be a dual-clutch transmission.

16 Claims, 4 Drawing Sheets

ENGINE POSITION CONTROL IN AN ENGINE STOP-START POWERTRAIN

TECHNICAL FIELD

The present disclosure relates to the control of engine position in a vehicle having an engine start-stop powertrain.

BACKGROUND

In order to minimize idle fuel consumption, some hybrid and other vehicle powertrains selectively cut off the supply of fuel to an internal combustion engine when the vehicle would otherwise be idling. Control of a vehicle transmission during the automatic engine restart process typically occurs via execution of a shift algorithm which is programmed into a transmission controller. To achieve the desired fuel savings, the engine must be rapidly restarted when the operator releases the brake pedal and depresses the accelerator.

SUMMARY

A method is disclosed herein for controlling engine stop position in a vehicle having automatic engine stop-start functionality. The method may be embodied as a set of computer-executable instructions which are selectively executed by an onboard controller or multiple distributed controllers. The present approach controls crankshaft speed during engine coast-down after an engine shutdown sequence has been initiated. The controller transmits clutch commands to a clutch of an automatic or dual-clutch transmission (DCT) to slow engine inertia by inducing parasitic and friction losses.

Engine stop position is thus controlled such that, after the engine has fully stopped, the position of the first firing cylinder in an engine firing sequence falls within a desired range of a target engine stop position. Such engine position control enables immediate engine fueling and restarting when an operator lifts a foot from the brake pedal and depresses an accelerator pedal, thus avoiding the inefficient periods of cam-crank resynchronization that are often needed for identifying a cylinder under compression in a conventional engine stop-start system.

In particular, a vehicle is disclosed having engine stop-start functionality. The vehicle includes a controller, a transmission having a clutch, and an engine having a crankshaft. A controller is in communication with the engine and the transmission, is configured for detecting a commanded shut down of the engine, as well as for actuating an engagement of the clutch after detecting the commanded shut down. In this manner, the controller controls the rate of deceleration of the crankshaft after shut down of the engine and stops the crankshaft within a calibrated range of a target stop position.

The above features and advantages and other features and advantages of the present invention are readily apparent from the following detailed description of the best modes for carrying out the invention when taken in connection with the accompanying drawings.

DETAILED DESCRIPTION

Figure 1:
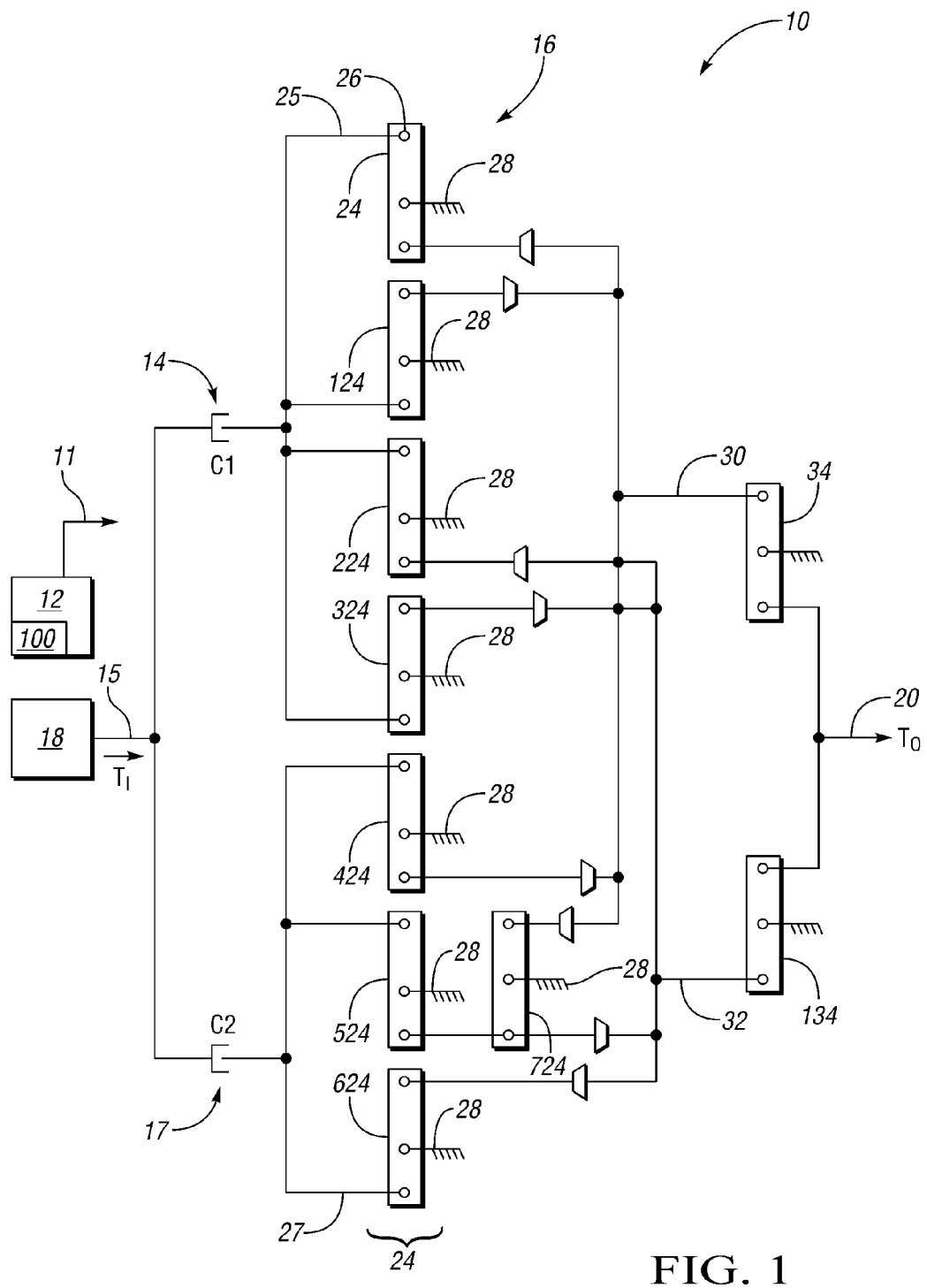
FIG. 1 is a schematic lever diagram of an example vehicle having a dual-clutch transmission and a controller for controlling engine stop position.

Referring to the drawings, wherein like reference numbers correspond to like or similar components throughout the several figures, an example vehicle 10 is shown in FIG. 1 in schematic lever diagram format. The vehicle 10 includes an internal combustion engine 18 and a dual-clutch transmission (DCT) 16. A controller 12 executes one of a pair of methods 100 or 200 as described below with reference to FIGS. 6 and 7, respectively, to achieve a target stop position of the engine 18 during the shutdown cycle of an engine stop-start event. The controller 12 controls engine stop position in part by controlling the actuation and imparted drag of one or both of a pair of input clutches 14 and/or 17 (C1 and C2, respectively) of the DCT 16. In a particular embodiment, the DCT 16 is configured as a 7-speed transmission, although one may alternatively configure the DCT as a 5-speed, 6-speed, 7-speed, 8-speed, etc.

As is understood in the art, a DCT is an automated, manual-like transmission having a gearbox with two independently-operated torque transfer mechanisms or clutches. A DCT may be wet or dry (dDCT). Associated electronic and hydraulic clutch control devices control the shift operation. In a DCT, one input clutch controls oddly-numbered gears, e.g., first, third, fifth, and reverse in a 7-speed transmission, while another input clutch controls the evenly-numbered gears, e.g., second, fourth, and sixth in the same 7-speed transmission. Using this unique gear arrangement, a DCT can be shifted through its various gears without totally interrupting power flow from the engine.

The engine 18 includes a crankshaft 15. The engine 18 delivers an input torque (arrow $T_I$) to the DCT 16 when the crankshaft 15 is rotating. The engine 18 has start-stop functionality as described above, i.e., the engine 18 may be selectively shut down to reduce idle fuel consumption and restarted when the operator lifts a foot off of a brake pedal and/or depresses an accelerator pedal. A motor (not shown) may be used to assist the cranking and restarting the engine 18.

The DCT 16 includes an output shaft 20 connected to a set of drive wheels (not shown). The output shaft 20 ultimately carries a transmission output torque (arrow $T_O$) to propel the vehicle 10. The DCT 16 may include, according to one embodiment, a first shaft 25 connected to the input clutch 14, a second shaft 27 connected to the input clutch 17, and gear sets 24-724. Each gear set 24-724 has a plurality of nodes 26, of which one in each gear set 24-274 is grounded to a stationary member 28, e.g., a transmission case or housing. The first shaft 25 is connected to and drives the odd gear sets, e.g., gear sets 24, 124, 224, and 324 in the non-limiting 7-speed transmission embodiment that is shown. The second shaft 27 is connected to and drives the even gear sets, e.g., gear sets 424, 524, and 624 in the 7-speed transmission shown in FIG. 1, with gear set 724 providing the required gearing for a reverse mode.

The DCT 16 further includes an upper and lower main shaft 30, 32, respectively, which are connected to final drive gear sets 34, 134. Final drive gear sets 34, 134 in turn are connected to the output shaft 20 to provide any required final gear reduction. Throughout FIG. 1, the trapezoidal-shaped symbols represent clutch synchronizers, as is well understood in the art.

As noted above, the controller 12 used for controlling stop position of the engine 18 may be configured as a microprocessor-based device(s) having such common elements as a microprocessor or CPU, memory including but not limited to: read only memory (ROM), random access memory (RAM), electrically-erasable programmable read-only memory (EEPROM), flash memory, etc., and circuitry including but not limited to: a high-speed clock (not shown), analog-to-digital (A/D) circuitry, digital-to-analog (D/A) circuitry, a digital signal processor or DSP, and the necessary input/output (I/O) devices and other signal conditioning and/or buffer circuitry. However configured, the controller 12 is operable for executing the methods 100 and 200 of respective FIGS. 6 and 7 to provide the required engine stop position control.

Figure 2:
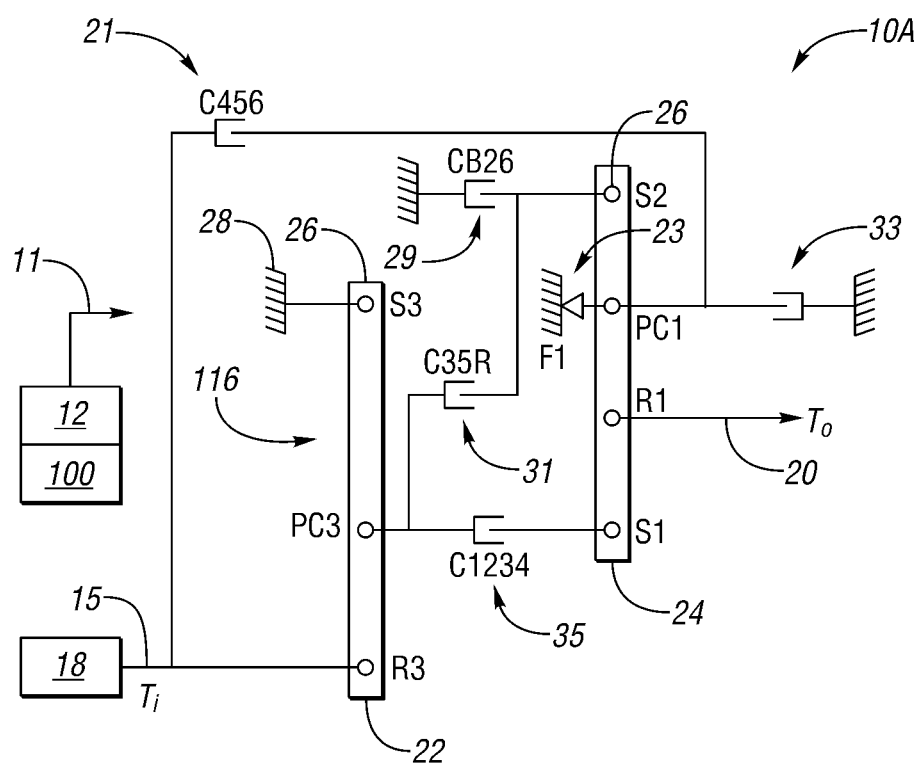
FIG. 2 is a schematic lever diagram of another example vehicle having an automatic transmission and a controller for controlling engine stop position.

Referring to FIG. 2, an alternative example vehicle 10A includes an automatic transmission 116. The transmission 116 has first and second planetary gear sets 22 and 24, respectively. As with the DCT 16 embodiment shown in FIG. 1, the present controller 12 can be used to control the engine as it spins down to a target stop position by controlling actuation of a designated clutch, e.g., clutch 35 (C1234) or other clutches. The 6-speed embodiment shown is illustrative of typical automatic transmissions, and is thus non-limiting. Those of ordinary skill in the art will appreciate that clutches of other transmission configurations of more or fewer speeds and more or fewer planetary gear sets could be controlled as set forth herein.

In the example embodiment of FIG. 2, nodes 26 of the planetary gear set 22 may include a sun gear (S3), a planetary carrier (PC3), and a ring gear (R3). Nodes 26 of the second gear set 24 may include a first sun gear (S1), a planetary carrier (PC1), a ring gear (R1), and a second sun gear (S2). Sun gear (S1) may be directly connected and thus grounded to the stationary member 28. Input torque ($T_I$) is delivered by the engine 18 to the ring gear (R3) of the first gear set 22, and to the input side of a clutch 21 (C456), with the numbers 4, 5, and 6 referring to the gears requiring actuation of the clutch 21 as is known in the art. Likewise, the letter B refers to braking clutch, with the absence of a B indicating a rotating clutch.

Other clutches include a braking clutch 29 (CB26) disposed between the stationary member 28 and the sun gear (S2) of the second gear set 24, a clutch 31 (C35R) disposed between the planetary carrier (PC3) of the first gear set 22 and the output side of clutch 29, and a clutch (C1234) 35 disposed between the planetary carrier (PC3) of the first gear set 22 and the sun gear (S1) of the second planetary gear set 24. A braking clutch 33 is disposed between the planetary carrier (PC1) of the second gear set and the stationary member 28 to enable low/reverse gears as needed. The same planetary carrier (PC1) is selectively connected to the stationary member 28 in a different manner via a one-way clutch 23 (F1).

In the example embodiments of FIGS. 1 and 2, as well as other vehicles using differently configured transmissions, various clutches are applied to decelerate the engine 18 in a controlled manner such that rotation of the engine 18 comes to a full stop with its next scheduled firing cylinder at or close to a target stop position, e.g., 72 degrees below top dead center (72 BTDC) in one possible embodiment. Such an embodiment might be useful in, for instance, a 4-cylinder engine. The same or other positions may be used for other engine configurations, and therefore 72 BTDC is not intended to be limiting.

Parasitic and friction losses are thus provided via controlled application of clutch drag of a designated transmission clutch, the identity of which can vary with the particular configuration and desired drag response. Upon achieving the target stop position for the engine 18, engine start can occur quickly with a predictable and repeatable start profile. In different embodiments, an adaptive open-loop control method (FIG. 6) or closed-loop control method (FIG. 7) can be used.

Figure 3:
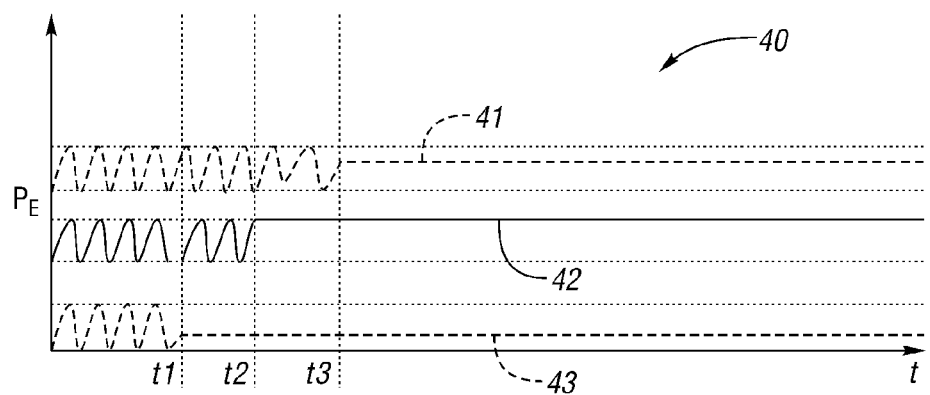
FIG. 3 is a time plot of engine cranking angle.
Figure 4:
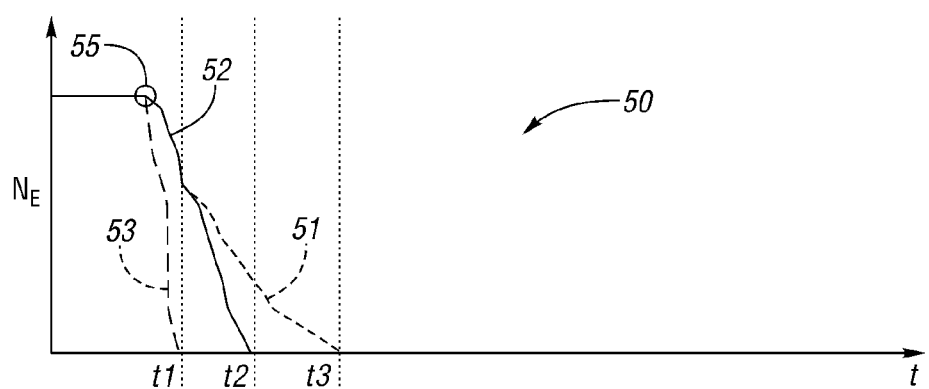
FIG. 4 is a time plot of engine speed.
Figure 5:
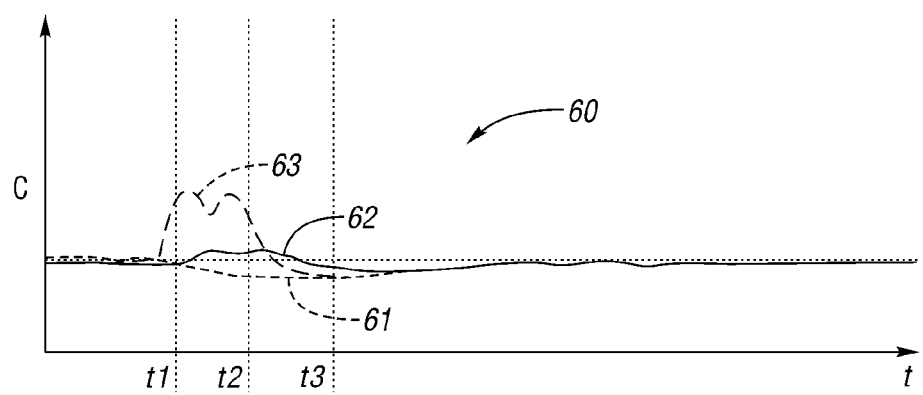
FIG. 5 is a time plot of clutch capacity.

FIGS. 3-5 are a set of vehicle performance time plots used to describe the present control approach during an engine auto-stop maneuver. FIG. 3 is a time plot 40 of different engine positions ($P_E$) possible during a start/stop maneuver. FIG. 4 is a time plot 50 of engine speed ($N_E$). FIG. 5 is a time plot 60 of clutch capacity (C).

Trace 42 of FIG. 3 shows a nominal level of position control, wherein a target stop position is achieved at $t_2$. Traces 41 and 43 represent respective later and earlier achievement of different stop positions, i.e., at $t_3$ and $t_1$, respectively.

In FIG. 4, traces 51, 52, and 53 correspond respectively to traces 41, 42, and 43 of FIG. 3. Engine shut down commences at approximately point 55. Fuel is cut off, and engine speed drops to zero at $t_2$. Nominal trace 52 achieves zero engine speed at $t_2$, which corresponds to the achieved engine position at the same point in time as indicated by trace 42 of FIG. 3. Different control approaches with more or less clutch drag could produce the different trajectories of traces 51 and 53, with trace 51 representing engine speed "sail on" for an unloaded crankshaft.

In FIG. 5, traces 61, 62, and 63 correspond respectively to traces 41, 42, and 43 of FIG. 3, and to traces 51, 52, and 53 of FIG. 4. Nominal trace 62 shows clutch capacity held above the clutch engagement point (i.e., the kiss point) between $t_1$ and $t_3$. Trace 63 shows that holding the clutch capacity well above the kiss point brakes the engine 18 much sooner (see trace 53 of FIG. 4), and trace 61 shows that holding clutch capacity well below the kiss point causes the engine 18 to sail with an unloaded crankshaft (see trace 51 of FIG. 4).

Figure 6:
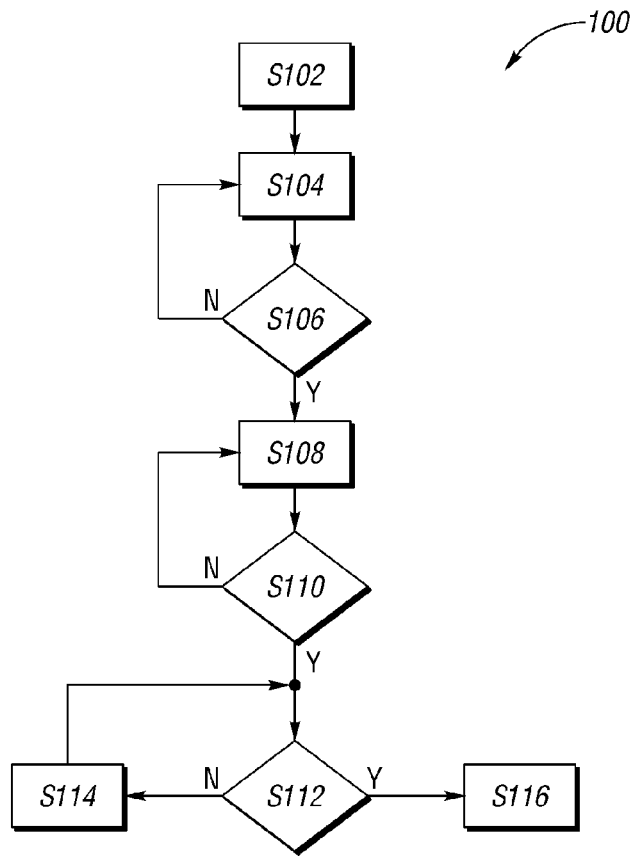
FIG. 6 is a flow chart describing an example open-loop control method for controlling engine stop position.
Figure 7:
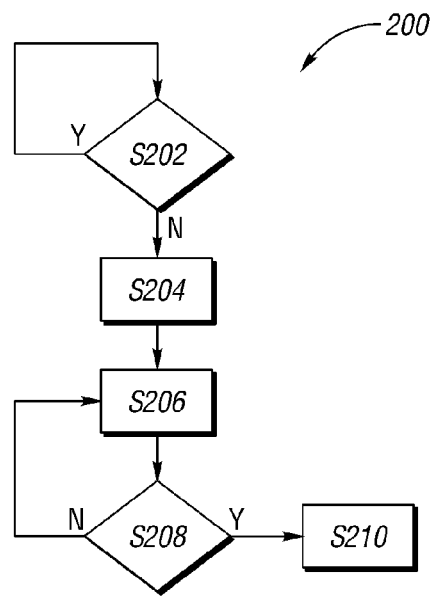
FIG. 7 is a flow chart describing an example closed-loop control method for controlling engine stop position.

Referring to FIG. 6 in conjunction with the structure of vehicles 10 and 10A shown in FIGS. 1 and 2, an example method 100 allows the engine 18 to be shut down and restarted with a consistent engine stop position, with examples shown in FIG. 3. Two possible approaches include controlling engine stop position using an adaptive open-loop control method and a closed-loop method. FIG. 6 describes the former, and will be described first. FIG. 7 describes the latter.

At step S102 of FIG. 6, drag force characteristics of the designated clutch are determined, offline, from idle. This is the clutch to be used for controlling engine stop position after shut down. Drag characteristics should yield an engine stopping position within a close margin of the target stop position. From this, the controller can determine the optimal cylinder event for disabling fuel in a manner which ultimately provides a desired engine deceleration trajectory, i.e., trace 51 of FIG. 4.

At step S104, the controller 12 determines that the vehicle has come to a stop, such as by detecting that a brake pedal has been applied, engine speed is near idle, and vehicle speed is at or near zero, etc. The controller 12 then commands the engine 18 to shut down.

At this point in time, which is approximately point 55 of FIG. 4, the fuel feed to the engine 18 is disabled, and the required drag torque of the engaged input clutch 14 or 17 is set in the controller 12. The required drag torque curve is applied, which ultimately controls the pressure delivered to the designated clutch. The designated clutch, e.g., the input clutch 14 or 17 of FIG. 1, is held at a predetermined level with respect to its kiss point as shown in FIG. 5. The designated clutch is then held at this point until the engine 18 stops at its target stop position. After engine shut down, the clutch 14 or 17 may be held just below the kiss point at a point where clutch drag is minimal. The method 100 proceeds to step S106.

At step S106, the controller 12 monitors changing engine speed (see FIG. 4), e.g., using speed sensors (not shown), and determines if engine speed is less than a calibrated threshold. Step S104 is repeated until engine speed is less than the threshold, at which point the method 100 proceeds to step S108.

At step S108, the controller 12 applies the dominant clutch, e.g., the clutch 14 or 17 of FIG. 1 depending on the mode in a DCT embodiment, and then continues to step S110.

At step S110, the controller 12 determines whether engine speed is at or within a minimum range of zero. Step S108 is repeated until engine speed is at or near zero, at which point the method 100 proceeds to step S112.

At step S112, the controller 12 determines if the first firing cylinder of the engine 18, which is a designated cylinder in a calibrated firing sequence retained in memory of the controller 12, is at a target engine position, e.g., 72 BTDC with respect to the intake valves of the engine 18 in an engine having four cylinders. If the firing cylinder is at the targeted engine position, the clutch drag torque is not adjusted, and the method 100 proceeds to step S116. Otherwise, the method 100 proceeds to step S114.

At step S114, the controller 12 transmits control signals (arrow 11) to the DCT 16 of FIG. 1 or transmission 116 of FIG. 2 to provide fine motion control of the dominant clutch, and then repeats step S112. The drag torque is adjusted at this step for the next engine stop event, which enables the controller 12 to continue to approach the target stop position over time, i.e., adaptively. Clutch drag is dynamically created in a controlled manner to provide a control loop on engine speed. Step S114 effectively achieves a controlled decrease in engine speed so that the stop position is always the same.

At step S116, the first cylinder to fire in the calibrated firing sequence is at the target engine position. Clutches may be engaged at full capacity to keep the engine from rolling back, or the drag profile is simply set with the potential for rollback in mind, such that the first cylinder is in the target stop position after rollback. The method 100 repeats step S102 with the next engine shutdown event.

Referring to FIG. 7, an optional open-loop method 200 is shown which can be used with the DCT 16 shown in FIG. 1 or the transmission 116 shown in FIG. 2. At step S202, the controller 12 determines if the vehicle 10 or 10A is coming to a stop. For instance, the controller 12 may determine if a brake pedal has been applied, if engine speed is near idle, and if vehicle speed is approaching zero.

At step S204, the controller 12 disables fuel after the autostop event has initiated.

At S206, the controller 12 continues applying a calibrated dynamic drag torque curve via the designated clutch while monitoring engine speed and position.

At S208, the controller 12 determines whether the engine 18 has stopped at a target stop position. If so, the method 200 proceeds to step S210, otherwise the controller 12 repeats step S206.

At step 210, the designated clutch can be applied at increased capacity to attenuate rollback of the engine 18, or the controller 12 accounts for such rollback in the drag curve beforehand.

While the best modes for carrying out the invention have been described in detail, those familiar with the art to which this invention relates will recognize various alternative designs and embodiments for practicing the invention within the scope of the appended claims.

The invention claimed is:

1. A vehicle having engine stop-start functionality, comprising:
   a transmission having a clutch;
   an engine having a crankshaft; and
   a controller in communication with the engine and the transmission, wherein the controller is configured for:
      detecting a commanded shut down of the engine; and
      engaging the clutch after detecting the commanded shut down to thereby control the rate of deceleration of the crankshaft and stop the crankshaft within a calibrated range of a target stop position at the end of shut down of the engine, including holding the clutch at or above an engagement point or kiss point until the crankshaft stops, and just below the engagement point or kiss point after the shut down of the engine.

2. The vehicle of claim 1, wherein the transmission is one of an automatic transmission and a dual-clutch transmission.

3. The vehicle of claim 1, wherein the target stop position is a stop position for a next-scheduled firing cylinder of the engine of approximately 72 degrees below top dead center (BTDC).

4. The vehicle of claim 1, wherein the controller is configured to determine drag force characteristics of the clutch from idle, and to provide a desired engine deceleration trajectory using the determined drag force characteristics.

5. The vehicle of claim 1, wherein the controller adjusts a drag torque of the clutch in a closed control loop when the crankshaft is not at the target stop position after the engine stops.

6. The vehicle of claim 1, wherein the controller is configured to selectively apply the clutch at an increased capacity to attenuate rollback of the engine.

7. A vehicle having engine stop-start functionality, comprising:
   a dual clutch transmission (DCT) having a pair of input clutches;
   an engine having a crankshaft; and
   a controller in communication with the engine and the DCT, wherein the controller is configured for:
      determining drag force characteristics of a designated one of the pair of input clutches from idle;
      detecting a commanded shut down of the engine; and
      engaging the designated one of the pair of input clutches after detecting the commanded shut down of the engine to thereby control a rate of deceleration of the crankshaft and stop the crankshaft within a calibrated range of a target stop position at the end of the commanded shut down of the engine, including providing a desired engine deceleration trajectory via the controller using the determined drag force characteristics.

8. The vehicle of claim 7, wherein the DCT is a seven-speed DCT.

9. The vehicle of claim 7, wherein the target stop position is a stop position for a next-scheduled firing cylinder of the engine of approximately 72 degrees below top dead center (BTDC).

10. The vehicle of claim 7, wherein the controller holds the designated clutch at or above an engagement point or kiss point after engine shut down until the crankshaft stops, and holds the designated clutch just below the engagement point or kiss point after the crankshaft stops.

11. The vehicle of claim 7, wherein the controller adjusts a drag torque of the clutch in a closed control loop when the crankshaft is not at the target stop position after the engine stops.

12. The vehicle of claim 7, wherein the controller is configured to selectively apply the designated clutch at an increased capacity to attenuate rollback of the engine.

13. A method for controlling engine stop position in a vehicle having a transmission with a clutch and an engine with auto start-stop functionality, the method comprising:
  detecting a commanded shut down of the engine;
  determining, for the clutch, a set of clutch drag torque characteristics needed for achieving a target stop position of a crankshaft of the engine;
  recording the determined clutch drag torque characteristics in memory of a controller; and
  engaging the clutch via the controller after detecting the commanded shut down of the engine to thereby control a rate of deceleration of the crankshaft and stop the crankshaft within a calibrated range of the target stop position at the end of shut down of the engine.

14. The method of claim 13, further comprising:
  detecting whether the crankshaft stops within a calibrated range of the target stop position; and
  adjusting the recorded clutch drag torque characteristics in a closed control loop when the crankshaft does not stop within the calibrated range.

15. The method of claim 13, further comprising;
  holding the clutch at or above an engagement or kiss point until the crankshaft stops; and
  holding the clutch just below the kiss point after the crankshaft stops.

16. The method of claim 15, wherein holding the clutch just below the kiss point after crankshaft stops includes applying the clutch at an increased capacity to attenuate rollback of the engine.

* * * * *